Patented Oct. 15, 1940

2,218,284

UNITED STATES PATENT OFFICE 2,218,284

CONDENSATION PRODUCT OF FREE RESINIC ACID AND ORGANIC AMINE AND PROCESS OF MAKING SAME

Almon G. Hovey, Pleasant Ridge, and Theodore S. Hodgins, Royal Oak, Mich., assignors to Reichhold Chemicals, Inc., Detroit, Mich.

No Drawing. Original application December 10, 1938, Serial No. 245,018. Divided and this application July 26, 1939, Serial No. 286,727

5 Claims. (Cl. 260—102)

The invention relates broadly to improvements in acid-amine condensation products, and the process of making the same, the present application being a division of our prior application Serial No. 245,018 filed December 10, 1938, which in turn is a continuation-in-part of an earlier application Serial No. 147,569 filed June 10, 1937, now Patent No. 2,153,801 dated April 11, 1939.

In our application Serial No. 245,018 it was shown that valuable products may be produced by fusing together various unsaturated organic acids, particularly polyfunctional carboxylic acids, with organic amines, wherein said acids and amines constitute the sole or at least the principal reacting ingredients. The present application is particularly concerned with the reaction of pyridine with rosin.

The novel condensation products produced according to our invention have been found to be useful for many different purposes, as for example, as ingredients in the manufacture of coating compositions such as paints, varnishes, enamels, lacquers, stains, adhesives for plywood, paper lamination etc., for sizing and wood sealing, for molding compositions, and in the rubber industry.

The invention will be more readily understood by reference to the accompanying specific example in which is set forth an illustrative embodiment of the inventive thought.

Example 75 parts of W. W. gum rosin was fused at 110–175° C. with 20 parts of pyridine for 15 minutes forming a very pale straw colored resin without foaming. The resin had a cure time of 20 seconds on the hot plate at 200° C. The product was insoluble in water, toluol and mineral spirits, but soluble in acetone and alcohol.

We claim:

1. A resinous condensation product formed by fusing together free abietic acid and pyridine.

2. A process of producing a resinous condensation product which comprises reacting 75 parts by weight of gum rosin with 20 parts by weight of pyridine at 110 to 175° C. for 15 minutes.

3. A resinous condensation product formed from gum rosin and pyridine in the proportions of 75 parts by weight of rosin to 20 parts by weight of pyridine, said condensation product being pale and straw colored and having a cure time of 20 seconds on the hot plate at 200° C., the product being insoluble in water, tuluol and mineral spirits but soluble in acetone and alcohol.

4. A process which comprises fusing together rosin and pyridine until a resinous condensation product is formed.

5. A process of producing a resinous condensation product which comprises fusing together rosin and pyridine for 15 minutes at 110–175° C.

ALMON G. HOVEY.
THEODORE S. HODGINS.